United States Patent
Morita et al.

(10) Patent No.: US 8,829,141 B2
(45) Date of Patent: Sep. 9, 2014

(54) EMULSION, ITS MANUFACTURING METHOD AND SILICONE OIL COMPOSITION

(75) Inventors: Yoshitsugu Morita, Ichihara (JP); Kazuo Kobayashi, Ichihara (JP)

(73) Assignee: Dow Corning Toray Co., Ltd., Chiyoda-Ku, Tokyo (JP)

( * ) Notice: Subject to any disclaimer, the term of this patent is extended or adjusted under 35 U.S.C. 154(b) by 214 days.

(21) Appl. No.: 13/395,515

(22) PCT Filed: Sep. 14, 2010

(86) PCT No.: PCT/JP2010/066276
§ 371 (c)(1),
(2), (4) Date: May 2, 2012

(87) PCT Pub. No.: WO2011/030932
PCT Pub. Date: Mar. 17, 2011

(65) Prior Publication Data
US 2012/0205580 A1  Aug. 16, 2012

(30) Foreign Application Priority Data
Sep. 14, 2009 (JP) ................................ 2009-212461

(51) Int. Cl.
*C08G 77/12* (2006.01)
*C08J 3/03* (2006.01)
*C08L 83/04* (2006.01)
*C08G 77/20* (2006.01)
*C08G 77/14* (2006.01)

(52) U.S. Cl.
CPC . *C08J 3/03* (2013.01); *C08G 77/20* (2013.01); *C08G 77/14* (2013.01); *C08G 77/12* (2013.01); *C08L 83/04* (2013.01); *C08J 2383/04* (2013.01)
USPC .............................................. 528/31; 528/32

(58) Field of Classification Search
CPC ......... C08L 83/04; C08L 83/00; C08G 77/14; C08G 77/12; C08G 77/20; C08G 77/16; C08G 77/18; C08K 5/5419
USPC ..................................................... 528/31, 32
See application file for complete search history.

(56) References Cited

U.S. PATENT DOCUMENTS

| | | | |
|---|---|---|---|
| 4,761,454 A | 8/1988 | Oba et al. | |
| 4,980,167 A | 12/1990 | Harashima et al. | |
| 6,057,386 A | 5/2000 | Morita et al. | |
| 6,238,656 B1 | 5/2001 | Morita et al. | |
| 6,267,842 B1 | 7/2001 | Ona et al. | |
| 6,388,005 B1 | 5/2002 | Morita et al. | |
| 6,528,121 B2 | 3/2003 | Ona et al. | |
| 7,276,556 B2 | 10/2007 | Morita et al. | |

FOREIGN PATENT DOCUMENTS

| | | | |
|---|---|---|---|
| EP | 0381166 | A2 | 8/1990 |
| EP | 1055771 | A1 | 11/2000 |
| EP | 1086935 | A2 | 3/2001 |
| EP | 1101487 | A1 | 5/2001 |
| EP | 1148089 | A1 | 10/2001 |
| JP | 62-257939 | A | 11/1987 |
| JP | 2243612 | A | 9/1990 |
| JP | 2000-281523 | A | 10/2000 |
| JP | 2000-281903 | A | 10/2000 |
| JP | 2000-328460 | A | 11/2000 |
| JP | 2001-139416 | A | 5/2001 |
| JP | 2001-294756 | A | 10/2001 |
| JP | 2002-249588 | A | 9/2002 |
| WO | WO 2011/030933 | A1 | 3/2011 |

OTHER PUBLICATIONS

English language abstract for JP 2000281523 extracted from the espacenet.com database on May 18, 2012, 24 pages.
English language abstract for JP 2000281903 extracted from the espacenet.com database on May 18, 2012, 14 pages.
English language abstract and translation extracted from the PAJ database on May 18, 2012, 35 pages.
International Search Report for Application No. PCT/JP2010/066276 dated Dec. 14, 2010, 4 pages.
English language abstract for JP 62-257939 extracted from the PAJ database on Sep. 11, 2012, 10 pages and English language equivalent is USPN 4,761,454.
International Search Report for Application No. PCT/JP2010/066277 dated Dec. 15, 2010, 4 pages.
English language abstract for JP 2000-328460 extracted from the espacenet.com database on Feb. 17, 2014, 11 pages.
English language abstract for JP 2001-139416 extracted from the espacenet.com database on Feb. 17, 2014, 22 pages.
English language abstract for JP 2001-294756 extracted from the espacenet.com database on Feb. 17, 2014, 11 pages.

*Primary Examiner* — Kuo-Liang Peng
(74) *Attorney, Agent, or Firm* — Howard & Howard Attorneys PLLC

(57) ABSTRACT

This invention relates to a silicone oil emulsion that contains cross-linked silicone particles in drops of silicone oil which have an average particle diameter of 0.1 to 500 μm and are dispersed in water, wherein the silicone oil contains epoxy groups, acryl groups, methacryl groups, silicon-bonded alkoxy groups, or silicon-bonded hydroxyl groups but is free of silicon-bonded hydrogen atoms and alkenyl groups, said cross-linked silicone particles is formed by a hydrosilation reaction. Furthermore, this invention also relates to a silicone oil composition obtained by removing water from said emulsion.

11 Claims, No Drawings

EMULSION, ITS MANUFACTURING METHOD AND SILICONE OIL COMPOSITION

RELATED APPLICATIONS

This application claims priority to and all the advantages of International Patent Application No. PCT/JP2010/066276, filed on Sep. 14, 2010, which claims priority to Japanese Patent Application No. 2009-212461, filed on Sep. 14, 2009.

TECHNICAL FIELD

This invention relates to a silicone oil emulsion that contains cross-linked silicone particles in silicone oil drops which are dispersed in water. The invention also relates to a manufacturing method of the aforementioned emulsion and to a silicone oil composition comprising cross-linked silicone particles and silicone oil.

BACKGROUND ART

Patent References No. 1 to 3 disclose a silicone oil emulsion that contains cross-linked silicone particles in silicone oil drops which are dispersed in water, and a method of manufacturing the aforementioned emulsion by cross-linking in water a cross-linkable silicone composition which contains a silicone oil, which does not participate in the cross-linking reaction (hereinafter referred to as "non-cross-linkable oil"), in an amount greater than that just needed to keep the cross-linked silicone particles dispersed in the cross-linked product. More specifically, when the cross-linkable silicone composition is cross-linked by a hydrosilylation reaction, the non-cross-linkable oil may be exemplified by a dimethylpolysiloxane having both molecular terminals capped with trimethylsiloxy groups, a methylphenylpolysiloxane having molecular terminals capped with trimethylsiloxy groups, a copolymer of a methylphenylpolysiloxane and a dimethylsiloxane having molecular terminals capped with trimethylsiloxy groups, or a cyclic dimethylsiloxane.

However, although Patent References No. 1 to No. 3 describe a silicone oil emulsion that contains cross-linked silicone particles in silicone oil drops which are dispersed in water and that the cross-linked silicone particles are formed from a silicone composition cross-linkable by a hydrosilation reaction, these References do not teach that such an emulsion is prepared from a silicone oil that contains epoxy, acryl, methacryl, silicon-bonded alkoxy, or silicon-bonded hydroxyl groups.

[Patent Reference 1] JP 2000-281523 A
[Patent Reference 2] JP 2000-281903 A
[Patent Reference 3] JP 2002-249588 A

DISCLOSURE OF INVENTION

Technical Problems to be Solved

It is an object of the present invention to provide a silicone oil emulsion that contains cross-linked silicone particles in drops of silicone oil having reactive groups; a manufacturing method of the aforementioned emulsion; and a silicone composition comprising cross-linked silicone particles uniformly dispersed in a silicone oil having reactive groups.

Solution to Problems

An emulsion of the present invention is a silicone oil emulsion that contains cross-linked silicone particles in drops of silicone oil which have an average particle diameter of 0.1 to 500 μm and are dispersed in water. This silicone oil contains epoxy groups, acryl groups, methacryl groups, silicon-bonded alkoxy groups, or silicon-bonded hydroxyl groups but is free of silicon-bonded hydrogen atoms and alkenyl groups. The cross-linked silicone particles are formed by means of a hydrosilation reaction.

A method of manufacturing an emulsion of the invention is comprised of dispersing a cross-linkable silicone composition (which is cross-linkable by a hydrosilation reaction and contains epoxy groups, acryl groups, methacryl groups, silicon-bonded alkoxy groups, or silicon-bonded hydroxyl groups but is free of silicon-bonded hydrogen atoms and alkenyl groups) in water and causing a cross-linking reaction.

The silicone oil composition of the present invention is obtained by removing water from a silicone oil emulsion that contains the cross-linked silicone particles contained in silicone oil drops of an average diameter of 0.1 to 500 μm which are dispersed in water,
the aforementioned silicone oil containing epoxy groups, acryl groups, methacryl groups, silicon-bonded alkoxy groups, or silicon-bonded hydroxyl groups but being free of silicon-bonded hydrogen atoms and alkenyl groups, the cross-linked silicone particles being prepared by a hydrosilylation cross-linking reaction.

Advantageous Effects of Invention

The emulsion of the present invention is characterized by containing cross-linked silicone particles in drops of silicone oil that contains reactive groups. The method of the invention is characterized by efficient preparation of the aforementioned emulsion. The silicone oil composition of the invention is characterized by containing cross-linked silicone particles dispersed in the silicone oil provided with reactive groups.

BEST MODE FOR CARRYING OUT THE INVENTION

First, the emulsion of the invention is described in more detail.

In the emulsion [of the invention], the silicone oil, which in which silicone oil drops dispersed in water are formed, contains epoxy groups, acryl groups methacryl groups, silicon-bonded alkoxy groups, or silicon-bonded hydroxyl groups but is free of silicon-bonded hydrogen atoms and alkenyl groups. The epoxy groups are exemplified by 3-glycidoxypropyl, 4-glycidoxybutyl, and other glycidoxyalkyl groups; 2-(3,4-epoxycyclohexyl)ethyl, 3-(3,4-epoxycyclohexyl)propyl, and other epoxycyclohexylalkyl groups; 4-oxylanylbutyl, 8-oxylanyloctyl, or similar oxylanylalkyl groups. The acryl groups are exemplified by 3-acryloxypropyl, 4-acryloxybutyl, and other acryloxyalkyl groups. The methacryl groups are exemplified by 3-methacryloxypropyl, 4-methacryloxybutyl, or other methacryloxyalkyl groups. The silicon-bonded alkoxy groups are exemplified by methoxy, ethoxy, and propoxy groups. Silicon-bonded groups other than the aforementioned reactive groups are exemplified by methyl, ethyl, propyl, or similar alkyl groups; phenyl, xylyl, or other aryl groups; benzyl, phenethyl, or other aralkyl groups; 3,3,3-trifluoropropyl, or other halogenated alkyl groups, or similar monovalent hydrocarbon groups, except for silicon-bonded hydrogen atoms and alkenyl groups. The methyl and phenyl groups are preferable. There are no special limitations with regard to the molecular structure of silicone oil used for the formation of the silicone oil drops. The silicone oil may have a completely linear, partially-branched linear, cyclic, or a branched-chain molecular structure. The most preferable is a linear molecular structure. There are no special limitations with regard to viscosity of the silicone oil at 25° C., provided that the oil is liquid. It may be recommended, however, that the viscosity is in the range of 1 to 100,000,000 mPa·s, preferably 2 to 10,000,000 mPa·s.

The silicone oil is exemplified by a dimethylpolysiloxane having both molecular terminals capped with glycidoxyalkyl groups, a copolymer of methylphenylsiloxane and dimethylsiloxane having both molecular terminals capped with glycidoxyalkyl groups, a copolymer of glycidoxyalkyl(methyl)siloxane and dimethylsiloxane having both molecular terminals capped with triorganosiloxy groups, a dimethylpolysiloxane having both molecular terminals capped with epoxycyclohexylalkyl groups, a copolymer of dimethylsiloxane and methylphenylsiloxane having at both molecular terminals epoxycyclohexylalkyl groups, an epoxycyclohexylalkyl(methyl)polysiloxane capped at both molecular terminals with triorganosiloxy groups, a copolymer of an epoxycyclohexylalkyl(methyl)polysiloxane and dimethylsiloxane having at both molecular terminals triorganosiloxy groups, or other silicone oils having epoxy groups; a dimethylpolysiloxane having at both molecular terminals methacryloxyalkyl groups;
a copolymer of a dimethylsiloxane and a methylphenylsiloxane having at both molecular terminals methacryloxyalkyl groups; a dimethylpolysiloxane having at both molecular terminals acryloxyalkyl groups; a copolymer of a dimethylsiloxane and a methylphenylsiloxane having at both molecular terminals acryloxyalkyl groups; a methacryloxyalkyl(methyl)polysiloxane having at both molecular terminals triorganosiloxy groups; a copolymer of a methacryloxyalkyl(methyl)polysiloxane and a dimethylsiloxane having at both molecular terminals triorganosiloxy groups, or other acryl or methacryl groups; a dimethylpolysiloxane having at both molecular terminals alkoxysilyl groups; a copolymer of a methylphenylsiloxane and a dimethylsiloxane having at both molecular terminals alkoxysilyl groups; a dimethylpolysiloxane having at both molecular terminals alkoxysilylalkyl groups; a copolymer of a dimethylpolysiloxane and a methylphenylsiloxane having at both molecular terminals alkoxysilylalkyl groups; an alkoxy(methyl)polysiloxane having at both molecular terminals triorganosiloxy groups; a copolymer of an alkoxy(methyl)polysiloxane and a dimethylsiloxane having at both molecular terminals triorganosiloxy groups, or other silicone oils having silicon-bonded alkoxy groups; and a copolymer of a methylphenylsiloxane and a dimethylsiloxane having at both molecular terminals silanol groups.

The average diameter of silicone oil drops in the emulsion of the present invention should be within a range of 0.1 to 500 µm, preferably within a range of 0.5 to 200 µm. This is because it is difficult to prepare the emulsion with an average diameter of drops below the lower limit of the above range. On the other hand, an emulsion with an average diameter of drops greater than the upper limit of the above range will have low stability.

The cross-linked silicone particles contained in the emulsion of the present invention are produced by a hydrosilation reaction. In order that the cross-linked silicone particles can be dispersed in water, the diameter of the cross-linked silicone particles should not exceed the diameter of the silicone oil drops. More specifically, the cross-linked silicone particles should have an average diameter in the range of 0.1 to 500 µm, and preferably, 0.5 to 50 µm. If the particles are smaller than the lower limit of the range, they will be difficult to form, and if, on the other hand, they exceed the upper limit of the range, the emulsion that contains such cross-linked silicone particles will become unstable. The cross-linked silicone particles may have a spherical, thread-like, flat, or irregular shape. The spherical shape is preferable.

Although there are no special limitations with regard to amount of water in the emulsion, it is preferred that water be used in an amount of 5 to 99 mass %, and preferably 10 to 80 mass % based upon the total weight of the emulsion.

If it is desired to improve the stability of the emulsion, the emulsion can be combined with a nonionic surface-active agent, a cationic surface-active agent, or an anionic surface-active agent. The most preferable surface-active agent is a nonionic surface-active agent. It is recommended that the surface-active agent be used in an amount of 0.1 to 20 parts by weight, preferably 0.5 to 10 parts by weight per 100 parts by weight of the total amount of the cross-linked silicone particles and the silicone oil.

The following is a more detailed description of the method used for manufacturing the emulsion of the invention.

The cross-linkable silicone composition prepared by the method of the invention is one that is cross-linked by a hydrosilation reaction when dispersed in water and contains epoxy groups, acryl groups, methacryl groups, silicon-bonded alkoxy groups, or silicon-bonded hydroxyl groups but is free of silicon-bonded hydrogen atoms and alkenyl groups (however, the aforementioned silicone oil is used in an amount greater than that just needed to keep the cross-linked silicone particles dispersed in the cross-linked product).

The cross-linkable silicone composition of the invention, which is cross-linkable by a hydrosilation reaction, comprises:
 (A) a silicone oil that contains in one molecule at least two alkenyl groups;
 (B) a silicone oil that contains in one molecule at least two silicon-bonded hydrogen atoms;
 (C) a silicone oil that contains epoxy groups, acryl groups, methacryl groups, silicon-bonded alkoxy groups, or silicon-bonded hydroxyl groups but is free of silicon-bonded hydrogen atoms and alkenyl groups; and
 (D) a hydrosilation catalyst.

The alkenyl groups of component (A) are represented by vinyl groups, allyl groups, butenyl groups, and hexenyl groups, of which the most preferable are vinyl and hexenyl groups. Silicon-bonded organic groups other than alkenyl groups are represented by methyl groups, ethyl groups, propyl groups, or similar alkyl groups; phenyl groups, tolyl groups, xylyl groups, or similar aryl groups; benzyl groups, phenethyl groups, or similar aralkyl groups; 3,3,3-trifluoropropyl groups, or similar halogenated hydrocarbon groups. The methyl and phenyl groups are preferable. Component (A) may have a linear, cyclic, net-like, or partially-branched linear molecular structure. In order to form elastomer-like cross-linked silicone particles, the linear and partially-branched linear structures are preferable. Although there are no special limitations with regard to the viscosity of the component (A) at 25° C., it is preferred that the viscosity be within a range of 20 to 100,000 mPa·s, preferably between 20 and 10,000 mPa·s.

The silicone oil of component (A) is represented by a dimethylpolysiloxane having both molecular terminals capped with dimethylvinylsiloxy groups, a copolymer of methylvinylsiloxane and dimethylsiloxane having dimethylvinylsiloxy groups on both molecular terminals, a copolymer of a methylvinylsiloxane and a dimethylsiloxane having dimethylvinylsiloxy groups at both molecular terminals, a dimethylpolysiloxane having dimethylhexenylsiloxy groups at both molecular terminals, a copolymer of a methylphenylsiloxane and a dimethylsiloxane having dimethylhexenylsiloxy groups at both molecular terminals, a copolymer of a dimethylsiloxane and a methylvinylsiloxane having trimethylsiloxy groups at both molecular terminals, and a copolymer of a dimethylsiloxane and a methylhexenylsiloxane having trimethylsiloxy groups at both molecular terminals.

Silicon-bonded organic groups other than hydrogen atoms of component (B) are represented by methyl groups, ethyl groups, propyl groups, or similar alkyl groups; phenyl groups, tolyl groups, xylyl groups, or similar aryl groups; benzyl groups, phenethyl groups, or similar aralkyl groups; 3,3,3-trifluoropropyl groups, or similar halogenated hydrocarbon groups. The methyl and phenyl groups are preferable. Component (B) may have a linear, cyclic, net-like, or partially-branched linear molecular structure. In order to form elastomer-like cross-linked silicone particles, the linear and partially-branched linear structures are preferable. Although there are no special limitations with regard to the viscosity of the component (B) at 25° C., it is preferred that the viscosity be within a range of 1 to 10,000 mPa·s.

The silicone oil of component (B) is represented by a dimethylpolysiloxane having dimethylhydrogensiloxy groups at both molecular terminals, a copolymer of a dimethylsiloxane and a methylhydrogensiloxane having dimethylhydrogensiloxy groups at both molecular terminals, a copolymer of a dimethylsiloxane and a methylhydrogensiloxane having trimethylsiloxy groups at both molecular terminals, and a methylhydrogenpolysiloxane having trimethylsiloxy groups at both molecular terminals.

It is recommended that component (B) be used in such an amount that the content of silicon-bonded hydrogen atoms in this component be in the range of 0.5 to 20 mole per one mole of alkenyl groups of component (A). If component (B) is used in an amount smaller than the recommended lower limit, it will be difficult to form cross-linked silicone particles. If, on the other hand, component (B) is used in an amount greater than the upper recommended limit, this will cause variations in physical properties of the obtained cross-linked silicone particles with time.

As has been mentioned above, silicone oil of component (C) may contain epoxy, acryl, methacryl, silicon-bonded alkoxy, or a silicon-bonded hydroxyl groups but should be free of silicon-bonded hydrogen atoms and alkenyl groups. There are no special limitations with regard to the molecular structure of component (C) which may have a completely linear, partially-branched linear, cyclic, or a branched-chain molecular structure. The linear structure is preferable. Also, there are special limitations with regard to viscosity of component (C) at 25° C., but it may be recommended, however, that the viscosity of this component is in the range of 1 to 100,000,000 mPa·s, preferably 2 to 10,000,000 mPa·s. The oil of component (C) can be the same silicone oil as those listed above.

Regarding the content of component (C), it should be used in an amount greater than that needed for the cross-linked product of the cross-linkable silicone composition to retain aforementioned component (C) (including the content of the cross-linked product itself). The amount of component (C) will depends on a combination of component (C) with the cross-linkable silicone composition, but in general, component (C) should be in the range of 200 to 5,000 parts by mass, preferably 250 to 2,000 parts by mass per 100 parts by mass of the sum of components (A) and (B) in the curable silicone composition.

Component (D) is a hydrosilation catalyst that is used for accelerating hydrosilation of components (A) and (B). This catalyst can be exemplified by a platinum-system catalyst, rhodium-system catalyst, and a palladium-system catalyst, of which the platinum-type catalyst is preferable. Such a platinum-type catalyst is represented by chloroplatinic acid, an alcoholic solution of chloroplatinic acid, an olefin complex of platinum, an alkenylsiloxane complex of platinum, platinum black, or silica that carries platinum.

The method of the present invention can be carried out by dispersing in water the cross-linkable silicone composition which has been premixed with component (D), or component (D) can be added to water after dispersing it in the catalyst-free cross-linkable silicone composition. It is preferred to use an aqueous dispersion containing the component (D) with an average particle diameter not exceeding 1 μm.

It is preferred that component (D) be used in an amount sufficient for accelerating the hydrosilation reaction of components (A) and (B). For example, when a platinum-type catalyst is used as component (D), it should be used in an amount of $1 \times 10^{-7}$ to $1 \times 10^{-3}$ parts by mass of platinum metal per 100 parts by weight of the sum of components (A) to (C).

A filler can be added to the cross-linkable silicone composition as an arbitrary component either for adjusting its flowability or for improving the mechanical strength of the obtained cross-linked silicone particles. Examples of such a filler are precipitated silica, fumed silica, baked silica, fumed titanium oxide, or a similar reinforcing filler; crushed quartz, diatomaceous earth, aluminosilicic acid, ferrous oxide, zinc oxide, calcium oxide, or a similar non-reinforcing filler. The surfaces of these fillers can be treated with hexamethylsilazane, trimethylchlorosilane, polydimethylsiloxane, polymethylhydridosiloxane, or similar organosilicon compounds.

There are no special limitations with regard to the amount of water used in the method. It is preferred, however, that water be used in an amount of 5 to 99 wt. %, preferably 10 to 80 wt. % based upon the total weight of the emulsion.

If in the method of the invention it is desired to improve the stability of the cross-linkable silicone composition in water or to ensure dispersion, the composition can be combined with a nonionic surfactant, a cationic surfactant, or an anionic surfactant. The most preferable surfactant is a nonionic surfactant. It is recommended that the surfactant be used in an amount of 0.1 to 20 parts by mass, preferably 0.5 to 10 parts by mass per 100 parts by mass of the cross-linkable silicone composition.

The method of the invention is characterized by dispersing in water a cross-linkable silicone composition that contains at least aforementioned components (A) through (D) and then conducting a cross-linking reaction. Dispersing the cross-linkable silicone composition in water can be carried out with the use of a homomixer, paddle mixer, Henschel mixer, homodisperser, colloid mixer, propeller-type stirrer, homodisperser, homogenizer, in-line type continuous emulsifier, ultrasonic emulsifier, vacuum kneader, or other mixing devices.

In order to accelerate a hydrosilation reaction of the cross-linkable silicone composition, the emulsion of the cross-linkable silicone composition may be heated. However, since heating impairs emulsion stability, it is preferable to conduct the hydrosilation reaction of the cross-linkable silicone composition at room temperature. There are no special restrictions with regard to the form in which the cross-linked silicone particles obtained from the cross-linkable silicone composition are produced, and the particles can be obtained as a rubber-like, gel-like, or a similar elastomeric cross-linked substance.

The following is a more detailed description of the silicone oil composition of the invention.
The silicone oil composition of the present invention is obtained by removing water from the silicone oil emulsion that contains the cross-linked silicone particles contained in silicone oil drops of an average diameter of 0.1 to 500 μm which are dispersed in water, the aforementioned silicone oil containing epoxy groups, acryl groups, methacryl groups, silicon-bonded alkoxy groups, or silicon-bonded hydroxyl groups but being free of silicon-bonded hydrogen atoms and alkenyl groups, the cross-linked silicone particles being prepared by a hydrosilylation reaction.

There are no special limitations with regard to the method for removal of water from the emulsion, and water can be removed, e.g., by drying or heating the emulsion.

A silicon oil emulsion obtained by the method described above will comprise of the cross-linked silicone particles and the silicone oil, wherein the cross-linked silicone particles are uniformly dispersed in the silicone oil.

A filler can be added to the cross-linkable silicone composition as an arbitrary component. Such a filled is exemplified by precipitated silica, fumed silica, baked silica, fumed titanium oxide, or a similar reinforcing filler; crushed quartz, diatomaceous earth, aluminosilicic acid, ferrous oxide, zinc oxide, calcium oxide, or a similar non-reinforcing filler. The surfaces of these fillers can be treated with hexamethylsilazane, trimethylchlorosilane, polydimethylsiloxane, polymethylhydridosiloxane, or similar organosilicon compounds.

EXAMPLES

The emulsions of the invention, manufacturing methods thereof, and the silicone compositions of the invention will now be explained in more detail with reference to the following practical examples. In these examples, all values of viscosity were measured at 25° C. The following procedures were applied for determining an average diameter of particles in the silicone oil emulsion, an average diameter of cross-linked silicone particles, and various properties of the silicone composition.

[Average Diameter of Silicone Oil Emulsion Particles]
The diameter of emulsion particles was measured with the use of a laser-diffraction type particle distribution measurement instrument of Horiba Seisakusho Co., model LA-500. The obtained median diameter (a particle diameter corresponding to 50% of the accumulated distribution) was defined as an average particle diameter.

Practical Example 1

A cross-linkable silicone composition was prepared by mixing the following components: 19.87 parts by mass of a dimethylpolysiloxane having 400 mPa·s viscosity and capped at both molecular terminals with dimethylvinylsiloxy groups (vinyl group content=0.48 mass %); 1.03 parts by mass of a 47 mPa·s viscosity copolymer of methylhydrogensiloxane and dimethylsiloxane capped at both molecular terminals with trimethylsiloxy groups (0.31 mass % content of silicon-bonded hydrogen and 0.9 moles of silicon-bonded hydrogen atoms per 1 vinyl group in the dimethylpolysiloxane); and 80.0 parts by mass of a 22 mPa·s viscosity silicone oil that contained glycidoxypropyl groups and was represented by the following average formula:

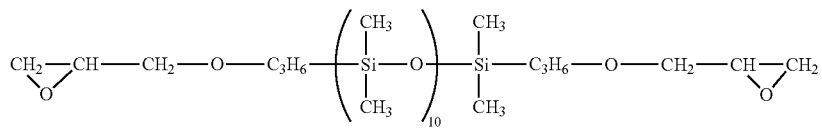

The obtained mixture was then emulsified by combining with 0.5 parts by mass of polyoxyethylenealkylether (a product of Sanyo Chemical Industries Co., Ltd., Sannonic SS120) and 30 parts by mass of pure water. After emulsification, 58 parts by mass of pure water were added to the mixture whereby an emulsion of a cross-linkable silicone composition was prepared. The average diameter of the particles in the emulsion was 3.2 μm.

A platinum-type catalyst comprising a 1,3-divinyl-1,1,3,3-tetramethyldisiloxane solution having a complex of platinum and 1,3-divinyl-1,1,3,3-tetramethyldisiloxane as its main component (average diameter of the platinum-system catalyst particles=0.05 μm; concentration of metallic platinum=0.05 mass %) was emulsified by uniformly mixing with water whereby an emulsion of a cross-linkable silicone composition with a content of metallic platinum equal to 20 ppm in terms of mass units per content of solids in the emulsion of the cross-linkable silicone composition was obtained.

The obtained emulsion was kept intact at room temperature for one day and then was subjected to a hydrosilation reaction, whereby there was prepared a silicone oil emulsion containing cross-linked silicone particles in drops of silicone oil having glycidoxypropyl groups and were dispersed in water.

The emulsion was then transferred to a 5 cm diameter aluminum plate, and water was removed from the emulsion by drying in air, while maintaining it in air flow for 1 week. As a result, a silicone oil composition consisting of cross-linked silicone particle and silicone oil having glycidoxypropyl groups was prepared. This silicone oil composition had a cream-like form. After stirring the obtained silicone oil composition in a dental mixer, viscosity was measured by means of a rotary type viscometer. The viscosity value was 17,460 mPa·s. Observation of the composition under a stereoscopic microscope showed that it consisted of cross-linked silicone particles uniformly dispersed in the silicone oil. The cross-linked silicone particles were spherical in shape.

Practical Example 2

A cross-linkable silicone composition was prepared by mixing the following components: 19.87 parts by mass of a dimethylpolysiloxane having 400 mPa·s viscosity and capped at both molecular terminals with dimethylvinylsiloxy groups (vinyl group content=0.48 mass %); 1.03 parts by mass of a copolymer of methylhydrogensiloxane having 47 mPa·s viscosity and the dimethylsiloxane is capped at both molecular terminals with trimethylsiloxy groups (0.31 mass % content of silicon-bonded hydrogen and 0.9 moles of silicon-bonded hydrogen atoms per 1 of vinyl group in the dimethylpolysiloxane); and 80.0 parts by mass of a silicone oil (having a viscosity of 40 mPa·s) contained methacryloxypropyl groups and was represented by the following average formula:

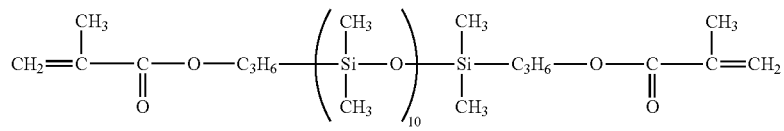

The obtained mixture was then emulsified by combining with 0.5 parts by mass of polyoxyethylenealkylether (a product of Sanyo Chemical Industries Co., Ltd., Sannonic SS120) and 30 parts by mass of pure water. After emulsification, 58 parts by mass of pure water were added to the mixture whereby an emulsion of a cross-linkable silicone composition was prepared. The average diameter of the particles in the emulsion was 4.4 μm.

A platinum-type catalyst comprising a 1,3-divinyl-1,1,3,3-tetramethyldisiloxane solution having a complex of platinum and 1,3-divinyl-1,1,3,3-tetramethyldisiloxane as its main component (average diameter of the platinum-type catalyst particles=0.05 μm; concentration of metallic platinum=0.05 mass %) was emulsified by uniformly mixing with water whereby an emulsion of a cross-linkable silicone composition with content of metallic platinum equal to 20 ppm in terms of mass units per content of solids in the emulsion of the cross-linkable silicone composition was obtained.

The obtained emulsion was kept intact at room temperature for one day and then was subjected to a hydrosilation reaction, whereby there was prepared a silicone oil emulsion containing cross-linked silicone particles in drops of silicone oil having methacryloxypropyl groups and were dispersed in water.

The emulsion was then transferred to a 5 cm diameter aluminum plate, and water was removed from the emulsion by drying in air, while maintaining it in air flow for 1 week. As a result, a silicone oil composition containing of cross-linked silicone particle and silicone oil having methacryloxypropyl groups was prepared. This silicone oil composition had a cream-like form. After stirring the obtained silicone oil composition in a dental mixer, viscosity was measured by means of a rotary type viscometer. The viscosity value was 123,000 mPa·s. Observation of the composition under a stereoscopic microscope showed that it consisted of cross-linked silicone particles uniformly dispersed in the silicone oil. The cross-linked silicone particles were spherical in shape.

Practical Example 3

A cross-linkable silicone composition was prepared by mixing the following components: 19.87 parts by mass of a dimethylpolysiloxane having 400 mPa·s viscosity and capped at both molecular terminals with dimethylvinylsiloxy groups (vinyl group content=0.48 mass %); 1.03 parts by mass of a copolymer (having a viscosity of 47 mPa·s) of methylhydrogensiloxane and dimethylsiloxane capped at both molecular terminals with trimethylsiloxy groups (0.31 mass % content of silicon-bonded hydrogen and 0.9 moles of silicon-bonded hydrogen atoms per 1 vinyl group in the dimethylpolysiloxane); and 80.0 parts by mass of a silicone oil that had a viscosity of 10 mPa·s, contained methacryloxypropyl groups and was represented by the following average formula:

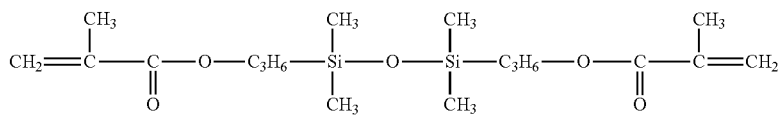

The obtained mixture was then emulsified by combining with 0.5 parts by mass of polyoxyethylenealkylether (a product of Sanyo Chemical Industries Co., Ltd., Sannonic SS120) and 30 parts by mass of pure water. After emulsification, 58 parts by mass of pure water were added to the mixture whereby an emulsion of a cross-linkable silicone composition was produced. The average diameter of the particles in the emulsion was 2.92 μm.

A platinum-type catalyst comprising a 1,3-divinyl-1,1,3,3-tetramethyldisiloxane solution having a complex of platinum and 1,3-divinyl-1,1,3,3-tetramethyldisiloxane as its main component (an average diameter of the platinum-system catalyst particles=0.05 μm; concentration of metallic platinum=0.05 mass %) was emulsified by uniformly mixing with water whereby an emulsion of a cross-linkable silicone composition with content of metallic platinum equal to 20 ppm in terms of mass units per content of solids in the emulsion of the cross-linkable silicone composition was obtained.

The obtained emulsion was kept intact at room temperature for one day and then was subjected to a hydrosilation reaction, whereby there was prepared a silicone oil emulsion having cross-linked silicone particles in drops of silicone oil that contained methacryloxypropyl groups and were dispersed in water.

The emulsion was then transferred to a 5 cm diameter aluminum plate, and water was removed from the emulsion by drying in air, while maintaining it in air flow for 1 week. As a result, a silicone oil composition consisting of cross-linked silicone particle and silicone oil having methacryloxypropyl groups was prepared. This silicone oil composition had a cream-like form. After stirring the obtained silicone oil composition in a dental mixer, viscosity was measured by means of a rotary type viscometer. The viscosity value was 4,400 mPa·s. Observation of the composition under a stereoscopic microscope showed that it consisted of cross-linked silicone particles uniformly dispersed in the silicone oil. The cross-linked silicone particles were spherical in shape.

Practical Example 4

A cross-linkable silicone composition was prepared by mixing the following components: 19.87 parts by mass of a dimethylpolysiloxane having 400 mPa·s viscosity and capped at both molecular terminals with dimethylvinylsiloxy groups (vinyl group content=0.48 mass %); 1.03 parts by mass of a copolymer (having a viscosity of 47 mPa·s) of methylhydrogensiloxane and dimethylsiloxane capped at both molecular terminals with trimethylsiloxy groups (0.31 mass % content of silicon-bonded hydrogen and 0.9 moles of silicon-bonded hydrogen atoms per 1 vinyl group in the dimethylpolysiloxane); and 80.0 parts by mass of a silicone oil that had a viscosity of 15 mPa·s, contained triethoxysilylethyl groups and was represented by the following average formula:

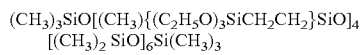

The obtained mixture was then emulsified by combining with 0.5 parts by mass of polyoxyethylenealkylether (a product of Sanyo Chemical Industries Co., Ltd., Sannonic SS120) and 30 parts by mass of pure water. After emulsification, 58 parts by mass of pure water were added to the mixture whereby an emulsion of a cross-linkable silicone composition was produced. The average diameter of the particles in the emulsion was 3.7 μm.

A platinum-type catalyst comprising a 1,3-divinyl-1,1,3,3-tetramethyldisiloxane solution having a complex of platinum and 1,3-divinyl-1,1,3,3-tetramethyldisiloxane as its main component (an average diameter of the platinum-type catalyst particles=0.05 μm; concentration of metallic platinum=0.05 mass %) was emulsified by uniformly mixing with water whereby an emulsion of a cross-linkable silicone composition with content of metallic platinum equal to 20 ppm in terms of mass units per content of solids in the emulsion of the cross-linkable silicone composition was obtained.

The obtained emulsion was kept intact at room temperature for one day and then was subjected to a hydrosilation reaction, whereby there was prepared a silicone oil emulsion containing cross-linked silicone particles in drops of silicone oil having methacryloxypropyl groups and dispersed in water.

The emulsion was then transferred to a 5 cm diameter aluminum plate, and water was removed from the emulsion by drying in air, while maintaining it in air flow for 1 week. As a result, a silicone oil composition consisting of cross-linked silicone particle and silicone oil having methacryloxypropyl groups was prepared. This silicone oil composition had a cream-like form. After stirring the obtained silicone oil composition in a dental mixer, viscosity was measured by means of a rotary type viscometer. The viscosity value was 1,670 mPa·s. Observation of the composition under a stereoscopic microscope showed that it consisted of cross-linked silicone particles uniformly dispersed in the silicone oil. The cross-linked silicone particles were spherical in shape.

Practical Example 5

A cross-linkable silicone composition was prepared by mixing the following components: 19.87 parts by mass of a dimethylpolysiloxane having 400 mPa·s viscosity and capped at both molecular terminals with dimethylvinylsiloxy groups (vinyl group content=0.48 mass %); 1.03 parts by mass of a 47 mPa·s viscosity copolymer of methylhydrogensiloxane and dimethylsiloxane capped at both molecular terminals with trimethylsiloxy groups (0.31 mass % content of silicon-bonded hydrogen and 0.9 moles of silicon-bonded hydrogen atoms per 1 vinyl group in the dimethylpolysiloxane); and 80.0 parts by mass of a 13 mPa·s viscosity silicone oil that contained silicon-bonded methoxy groups and was represented by the following average formula:

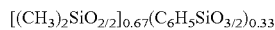

The obtained mixture was then emulsified by combining with 0.5 parts by mass of polyoxyethylenealkylether (a product of Sanyo Chemical Industries Co., Ltd., Sannonic SS120) and 30 parts by mass of pure water. After emulsification, 58 parts by mass of pure water were added to the mixture whereby an emulsion of a cross-linkable silicone composition was prepared. The average diameter of the particles in the emulsion was 3.7 μm.

A platinum-type catalyst comprising a 1,3-divinyl-1,1,3,3-tetramethyldisiloxane solution having a complex of platinum and 1,3-divinyl-1,1,3,3-tetramethyldisiloxane as its main component (an average diameter of the platinum-system catalyst particles=0.05 μm; concentration of metallic platinum=0.05 mass %) was emulsified by uniformly mixing with water whereby an emulsion of a cross-linkable silicone composition with content of metallic platinum equal to 20 ppm in terms of mass units per content of solids in the emulsion of the cross-linkable silicone composition was obtained.

The obtained emulsion was kept intact at room temperature for one day and then was subjected to a hydrosilation reaction, whereby there was prepared a silicone oil emulsion having cross-linked silicone particles in drops of silicone oil having silicon-bonded methoxy groups and were dispersed in water.

The emulsion was then transferred to a 5 cm diameter aluminum plate, and water was removed from the emulsion by drying in air, while maintaining it in air flow for 1 week. As a result, a silicone oil composition consisting of cross-linked silicone particle and silicone oil having methacryloxypropyl groups was prepared. This silicone oil composition had a cream-like form. After stirring the obtained silicone oil composition in a dental mixer, viscosity was measured by means of a rotary type viscometer. The viscosity value was 1,670 mPa·s. Observation of the composition under a stereoscopic microscope showed that it consisted of cross-linked silicone particles uniformly dispersed in the silicone oil. The cross-linked silicone particles were spherical in shape.

Comparative Example 1

A cross-linkable silicone composition was prepared by mixing the following components: 19.87 parts by mass of a dimethylpolysiloxane having 400 mPa·s viscosity and capped at both molecular terminals with dimethylvinylsiloxy groups (vinyl group content=0.48 mass %); and 1.03 parts by mass of a 47 mPa·s viscosity copolymer of methylhydrogensiloxane and dimethylsiloxane capped at both molecular terminals with trimethylsiloxy groups (0.31 mass % content of silicon-bonded hydrogen and 0.9 moles of silicon-bonded hydrogen atoms per 1 vinyl group in the dimethylpolysiloxane). The obtained mixture was then emulsified by combining with 0.5 parts by mass of polyoxyethylenealkylether (a product of Sanyo Chemical Industries Co., Ltd., Sannonic SS120) and 30 parts by mass of pure water. After emulsification, 58 parts by mass of pure water were added to the mixture whereby an emulsion of a cross-linkable silicone composition was produced. The average diameter of the particles in the emulsion was equal to 2.1 μm.

A platinum-type catalyst comprising a 1,3-divinyl-1,1,3,3-tetramethyldisiloxane solution having a complex of platinum and 1,3-divinyl-1,1,3,3-tetramethyldisiloxane as its main component (average diameter of the platinum-system catalyst particles=0.05 μm; concentration of metallic platinum=0.05 mass %) was emulsified by uniformly mixing with water, whereby an emulsion of a cross-linkable silicone composition with content of metallic platinum equal to 20 ppm in terms of mass units per content of solids in the emulsion of the cross-linkable silicone composition was obtained.

The obtained emulsion was kept intact at room temperature for one day and then was subjected to a hydrosilation reaction, whereby there was prepared an aqueous suspension of cross-linked silicone particles.

Cross-linked silicone particles were prepared by transferring the obtained aqueous dispersion to a 5 cm diameter aluminum plate and removing water from the dispersion by drying in air, while maintaining the dispersion in air flow for 1 week. The obtained particles were combined with 80.00 parts by mass of a 22 mPa·s viscosity silicone oil that had glycidoxypropyl groups and was represented by the following average formula:

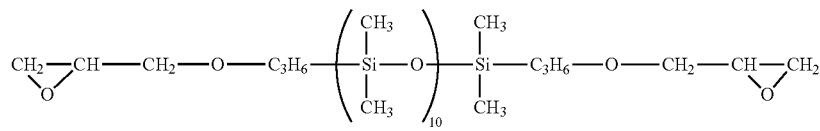

These components were mixed with a mortar. However, the obtained composition was non-uniform, and particles were agglomerated.

INDUSTRIAL APPLICABILITY

The emulsion of the present invention is an emulsion that contains cross-linked silicone particles in drops of silicone oil dispersed in water. Since the aforementioned silicone oil has reactive groups, the silicone oil composition obtained after removal of water from the emulsion can be used as an additive to curable organic resins. Furthermore, by combining this silicone oil with a curing agent and cross-linking agent, or a sensitizer, a cross-linkable silicone oil composition can be prepared.

The invention claimed is:

1. A silicone oil emulsion that contains cross-linked silicone particles in drops of silicone oil, wherein said drops of silicone oil have an average diameter of 0.1 to 500 μm and are dispersed in water, wherein the silicone oil has a linear structure, a viscosity of 1 to 100,000,000 mPa·s at 25° C. and has acryl groups, methacryl groups, silicon-bonded alkoxy groups, or silicon-bonded hydroxyl groups but is free of silicon-bonded hydrogen atoms and alkenyl groups, and the cross-linked silicone particles are formed by a hydrosilation reaction.

2. The silicone oil emulsion according to claim 1, wherein the cross-linked silicone particles in drops of silicone oil are obtained by a hydrosilation reaction of a cross-linkable silicone composition comprising:
 (A) a silicone oil that contains in one molecule at least two alkenyl groups;
 (B) a silicone oil that contains in one molecule at least two silicon-bonded hydrogen atoms;
 (C) a silicone oil that has a linear structure, a viscosity of 1 to 10,000,000 mPa·s at 25° C. and contains acryl groups, methacryl groups, silicon-bonded alkoxy groups, or silicon-bonded hydroxyl groups but is free of silicon-bonded hydrogen atoms and alkenyl groups, said silicone oil (C) present in from 250 to 2,000 parts by mass per 100 parts by mass of the sum of components (A) and (B); and
 (D) a hydrosilation catalyst.

3. A method of manufacturing a silicone oil emulsion that contains cross-linked silicone particles in silicone oil drops, wherein said silicone oil drops have an average diameter of 0.1 to 500 μm and are dispersed in water, the method comprising dispersing in water a cross-linkable silicone composition, which is cross-linkable by a hydrosilation reaction and has a silicone oil that has a linear structure, a viscosity of 1 to 10,000,000 mPa·s at 25° C. and contains acryl groups, methacryl groups, silicon-bonded alkoxy groups, or silicon-bonded hydroxyl groups but is free of silicon-bonded hydrogen atoms and alkenyl groups, and cross-linking the cross-linkable silicone composition by a hydrosilylation reaction after the cross-linkable silicone composition is dispersed in water; wherein the silicone oil is used in an amount greater than that needed for the cross-linked product of the cross-linkable silicone composition to retain the silicone oil.

4. The method according to claim 3, wherein the cross-linkable silicone composition comprises:
 (A) a silicone oil that contains in one molecule at least two alkenyl groups;
 (B) a silicone oil that contains in one molecule at least two silicon-bonded hydrogen atoms;
 (C) a silicone oil that has a linear structure, a viscosity of 1 to 10,000,000 mPa·s at 25° C. and contains acryl groups, methacryl groups, silicon-bonded alkoxy groups, or silicon-bonded hydroxyl groups but is free of silicon-bonded hydrogen atoms and alkenyl groups, the silicone oil (C) present in from 250 to 2,000 parts by mass per 100 parts by mass of the sum of components (A) and (B); and
 (D) a hydrosilation catalyst.

5. A silicone oil composition comprising cross-linked silicone particles and a silicone oil, wherein the cross-linked silicone particles are obtained by removing water from a silicone oil emulsion that contains the cross-linked silicone particles in silicone oil drops, said silicone oil drops having an average diameter of 0.1 to 500 μm and are dispersed in water, wherein the silicone oil has a linear structure, a viscosity of 1 to 10,000,000 mPa·s at 25° C. and acryl groups, methacryl groups, silicon-bonded alkoxy groups, or silicon-bonded hydroxyl groups but is free of silicon-bonded hydrogen atoms and alkenyl groups, and wherein the cross-linked silicone particles are prepared by a hydrosilylation reaction.

6. The silicone oil emulsion according to claim 1, wherein the silicone oil has a viscosity of 2 to 10,000,000 mPa·s at 25° C.

7. The method according to claim 3, wherein the silicone oil has a viscosity of 2 to 10,000,000 mPa·s at 25° C.

8. The silicone oil composition according to claim 5, wherein the silicone oil has a viscosity of 2 to 10,000,000 mPa·s at 25° C.

9. The silicone oil emulsion according to claim 1, wherein the average diameter of the drops of silicone oil is 0.5 to 200 μm.

10. The method according to claim 3, wherein the average diameter of the drops of silicone oil is 0.5 to 200 μm.

11. The silicone oil composition according to claim 5, wherein the average diameter of the drops of silicone oil is 0.5 to 200 μm.

* * * * *